Patented Apr. 18, 1950

2,504,929

UNITED STATES PATENT OFFICE 2,504,929

POLYVINYL CHLORIDE RESIN PLASTICIZED WITH 1,5-PENTANEDIOL-BIS-CYCLOHEXYL ACETATE

Stanford J. Hetzel, Cheltenham, Pa., assignor to Sun Oil Company, Philadelphia, Pa., a corporation of New Jersey No Drawing. Application August 25, 1948, Serial No. 46,187

2 Claims. (Cl. 260—31.6)

The present invention relates to a plasticized polyvinyl resin. Specifically it relates to a polyvinyl chloride resin in plasticized composition with 1,5-pentanediol bis-cyclohexylacetate.

In copending application for patent Serial No. 46,182 filed August 25, 1948, now Patent Number 2,500,033, the foregoing ester and its method of preparation are described and claimed. According to that application the ester was prepared by refluxing in the presence of a trace of an acid catalyst 1,5-pentanediol with approximately stoichiometric quantities of cyclohexylacetic acid in the presence of a solvent. The ester is there described to be a colorless to amber oil-like material having a boiling point at 5 mm. Hg of about 210° C.–216° C., a refractive index $N_D^{20°\ C.}$ 1.4726 and a density of $D_4^{20°\ C.}$ 1.10073.

According to the present invention polyvinyl chloride or polyvinyl chloride in admixture with polyvinyl acetate is compounded with the foregoing ester according to the practice usual in the art.

The following example illustrates the invention:

Example

A commercial polyvinyl resin (76.05 grams), known as Geon 101 and composed mainly or wholly of polyvinyl chloride, was mixed together with lead carbonate (1.24 grams) and stearic acid (0.59 gram) in the dry state by ball milling. Fifty-two grams of the plasticizer product of the invention was added in a cake mixer and the mass stirred thoroughly until good mixing was obtained. This mass was then fused on a 3" x 8" rubber mill whose rolls were heated to a temperature of about 285° F. The banded material was cut several times from each side and sheeted off at about 0.030 inch to give a rough sheet of about 0.070 inch when cooled. Part of this sheet was remilled to give a thin sheet of about 0.010 inch. Milling times were about 6 minutes and 2 minutes respectively. The thin sheet (0.010") furnished material for volatility and water extraction tests. After five minutes preheating at 160° C. the rough sheet was molded for 10 minutes at 1500 lbs./sq. in. in a 5¾" square steel mold to give a smooth sheet about 0.045" thick. This sheet (0.045") furnished material for tensile strength, modulus, elongation, brittle point, heat stability and Shore hardness tests. Test results were as follows:

Volatility (weight loss at 100° C.—3 hours) _____percent__ 0.09
Water extraction (weight loss in water after 10 days at room temperature) _____percent__ 0.13
Tensile strength (Scott—ASTM D412-41) _____lbs./sq. in__ 1850
Modulus at 300% elongation __lbs./sq. in__ 1850
Elongation _____ percent__ 335
Brittle point _____°C__ Minus 60
Heat stability (time for color change at 160° C.) _____hours__ 6
Shore hardness _____ 68

I claim:
1. A process of plasticizing a polyvinyl chloride resin which comprises the step of milling together said resin with 1,5-pentanediol-bis-cyclohexylacetate as plasticizer.
2. A composition comprising a polyvinyl chloride resin plasticized with 1,5-pentanediol bis-cyclohexylacetate.

STANFORD J. HETZEL.

REFERENCES CITED

The following references are of record in the file of this patent:

UNITED STATES PATENTS

| Number | Name | Date |
|---|---|---|
| 2,017,070 | Lazier | Oct. 15, 1935 |